(12) United States Patent
Kolavennu et al.

(10) Patent No.: US 12,658,014 B2
(45) Date of Patent: Jun. 16, 2026

(54) SYSTEMS AND METHODS FOR IDENTIFYING USER-CUSTOMIZED RELEVANT INDIVIDUALS IN AN AMBIENT IMAGE AT A DOORBELL DEVICE

(71) Applicant: Resideo USA LLC, Golden Valley, MN (US)

(72) Inventors: Soumitri Kolavennu, Blaine, MN (US); Nathaniel Kraft, Minnetonka, MN (US)

(73) Assignee: Resideo USA LLC, Golden Valley, MN (US)

( * ) Notice: Subject to any disclaimer, the term of this patent is extended or adjusted under 35 U.S.C. 154(b) by 0 days.

(21) Appl. No.: 18/655,829

(22) Filed: May 6, 2024

(65) Prior Publication Data

US 2024/0290186 A1 Aug. 29, 2024

Related U.S. Application Data

(63) Continuation of application No. 16/860,157, filed on Apr. 28, 2020, now Pat. No. 11,978,328.

(51) Int. Cl.
*H04N 23/61* (2023.01)
*G06F 16/51* (2019.01)
(Continued)

(52) U.S. Cl.
CPC ......... *G08B 13/1968* (2013.01); *G06F 16/51* (2019.01); *G06F 16/535* (2019.01);
(Continued)

(58) Field of Classification Search
USPC ........................................................ 348/152
See application file for complete search history.

(56) References Cited

U.S. PATENT DOCUMENTS 7,634,662 B2    12/2009  Monroe
10,140,718 B2   11/2018  Chen et al.
(Continued)

FOREIGN PATENT DOCUMENTS

CN        108921001 A      11/2018
CN        110414305 A      11/2019
WO       2019202587 A1     10/2019

OTHER PUBLICATIONS

Chan et al., "A Fuzzy Qualitative Approach to Human Motion Recognition," IEEE International Conference on Fuzzy Systems, pp. 1242-1249, Jun. 1, 2008.
(Continued)

*Primary Examiner* — Nigar Chowdhury
(74) *Attorney, Agent, or Firm* — Greenberg Traurig, LLP; Nicholas Martin; David J. Dykeman

(57) ABSTRACT

Systems and methods for identifying user-customized relevant individuals in an ambient image at a doorbell device are provided. Such systems and methods can include receiving user input that includes image information, using the image information to compile a custom image database containing a plurality of images that depict such relevant individuals, and storing the custom image database in local memory of the doorbell device. Then, such systems and methods can include capturing an ambient image with a camera of the doorbell device, determining whether any person depicted in the ambient image matches any of the relevant individuals by comparing the ambient image to the plurality of images at the doorbell device, and generating an alert when any person depicted in the ambient image matches any of the relevant individuals.

18 Claims, 2 Drawing Sheets

(51) Int. Cl.

| | |
|---|---|
| *G06F 16/535* | (2019.01) |
| *G06F 16/56* | (2019.01) |
| *G06F 16/583* | (2019.01) |
| *G06F 16/587* | (2019.01) |
| *G06N 5/04* | (2023.01) |
| *G06N 20/00* | (2019.01) |
| *G06Q 50/26* | (2012.01) |
| *G06V 40/16* | (2022.01) |
| *G06V 40/50* | (2022.01) |
| *G08B 13/196* | (2006.01) |

(52) U.S. Cl.
CPC .......... *G06F 16/56* (2019.01); *G06F 16/5854* (2019.01); *G06F 16/587* (2019.01); *G06N 5/04* (2013.01); *G06N 20/00* (2019.01); *G06Q 50/265* (2013.01); *G06V 40/172* (2022.01); *G06V 40/50* (2022.01); *H04N 23/61* (2023.01)

(56) References Cited

U.S. PATENT DOCUMENTS

| | | | | |
|---|---|---|---|---|
| 10,475,311 | B2 | 11/2019 | Siminoff | |
| 10,489,887 | B2 | 11/2019 | El-Khamy et al. | |
| 10,726,274 | B1 | 7/2020 | Hasegawa et al. | |
| 10,861,265 | B1 | 12/2020 | Merkley et al. | |
| 10,997,703 | B1 * | 5/2021 | Khalatian | G06V 40/169 |
| 11,004,113 | B1 * | 5/2021 | Sorensen | G06F 1/3231 |
| 11,304,123 | B1 | 4/2022 | Noonan | |
| 11,978,328 | B2 | 5/2024 | Kolavennu et al. | |
| 2003/0018531 | A1 | 1/2003 | Mahaffy et al. | |
| 2004/0005086 | A1 | 1/2004 | Wolff et al. | |
| 2006/0212341 | A1 | 9/2006 | Powers | |
| 2009/0002157 | A1 | 1/2009 | Donovan et al. | |
| 2009/0176544 | A1 | 7/2009 | Mertens | |
| 2009/0181640 | A1 | 7/2009 | Jones | |
| 2009/0208052 | A1 | 8/2009 | Kaplan | |
| 2009/0222388 | A1 | 9/2009 | Hua et al. | |
| 2009/0319361 | A1 | 12/2009 | Conrady | |
| 2013/0127980 | A1 * | 5/2013 | Haddick | G06F 3/013 |
| | | | | 348/14.08 |
| 2013/0202274 | A1 * | 8/2013 | Chan | H04N 5/77 |
| | | | | 386/362 |
| 2014/0032538 | A1 | 1/2014 | Arngren et al. | |
| 2015/0363500 | A1 | 12/2015 | Bhamidipati et al. | |
| 2016/0065861 | A1 | 3/2016 | Steinberg et al. | |
| 2016/0132720 | A1 | 5/2016 | Klare et al. | |
| 2016/0196467 | A1 | 7/2016 | Xia | |
| 2017/0083790 | A1 | 3/2017 | Risinger et al. | |
| 2017/0085844 | A1 | 3/2017 | Scalisi et al. | |
| 2017/0092109 | A1 | 3/2017 | Trundle et al. | |
| 2018/0059660 | A1 | 3/2018 | Heatzig et al. | |
| 2018/0121571 | A1 | 5/2018 | Tiwari et al. | |
| 2018/0268674 | A1 | 9/2018 | Siminoff | |
| 2018/0285648 | A1 | 10/2018 | Pan et al. | |
| 2018/0307903 | A1 | 10/2018 | Siminoff | |
| 2019/0035242 | A1 | 1/2019 | Vazirani | |
| 2019/0130278 | A1 | 5/2019 | Karras et al. | |
| 2019/0130583 | A1 | 5/2019 | Chen et al. | |
| 2019/0188980 | A1 | 6/2019 | Viswanathan et al. | |
| 2019/0197848 | A1 | 6/2019 | Bradley et al. | |
| 2019/0304274 | A1 * | 10/2019 | Britton | G07C 9/25 |
| 2019/0318283 | A1 * | 10/2019 | Kelly | G06Q 10/1095 |
| 2019/0327448 | A1 * | 10/2019 | Fu | G08B 3/10 |
| 2019/0373186 | A1 | 12/2019 | Ortiz Egea et al. | |
| 2019/0376808 | A1 * | 12/2019 | Shikanai | G01C 21/3484 |
| 2019/0377961 | A1 * | 12/2019 | Inai | G07C 5/008 |
| 2020/0019921 | A1 | 1/2020 | Buibas et al. | |
| 2020/0020221 | A1 | 1/2020 | Cutler et al. | |
| 2020/0135182 | A1 | 4/2020 | Kahlon et al. | |
| 2020/0175303 | A1 * | 6/2020 | Bhat | H04L 51/10 |
| 2020/0242336 | A1 | 7/2020 | Boic | |
| 2020/0301936 | A1 | 9/2020 | Kahlon | |
| 2020/0394804 | A1 | 12/2020 | Barton et al. | |
| 2021/0152880 | A1 | 5/2021 | Marten et al. | |
| 2021/0192186 | A1 * | 6/2021 | Kim | G06N 3/04 |
| 2021/0209349 | A1 | 7/2021 | Mehl et al. | |
| 2023/0186626 | A1 * | 6/2023 | Latapie | G06V 10/70 |
| | | | | 382/103 |
| 2023/0196898 | A1 * | 6/2023 | Snyder | G06V 20/56 |
| | | | | 702/189 |
| 2024/0153275 | A1 * | 5/2024 | Jagadeesan | G06V 20/53 |
| 2024/0265755 | A1 * | 8/2024 | Carter | G06V 20/10 |

OTHER PUBLICATIONS

Eng et al., "Dews: A Live Visual Surveillance System for Early Drowning Detection at Pool" IEEE Transactions on Circuits and Systems for Video Technology, vol. 18, No. 2, pp. 197-208, Feb. 2008.

Europe IBM Intelligent Video Analytics V3.0, 5725-H94, IBM Intelligent Video Analytics V3.0, IBM Europe Sales Manual, Revised Apr. 23, 2019, https://ww-01.ibm.com/common/ssi/ShowDoc.wss?docURL=/common/ssi/rep_sm/4/877/ENUS5725-H94/index.html&lang=/common/ssi/rep_sm/4/877/ENUS5725-H94/index.html&lang_en&request_locale=en, 15 pages.

Jalal et al., "A Depth Video-Based Human Detection and Activity Recognition Using Multi-Features and Embedded Hidden Markov Models for Health Care Monitoring Systems," International Journal of Interactive Multimedia and Artificial Intelligence, vol. 4, No. 4, pp. 54-62, 2017.

Jia et al., "Super-Resolution with Deep Adaptive Image Resampling," arXiv preprint: 1712.06463, pp. 1-10, Dec. 2017.

Lai et al., "Deep Laplacian Pyramid Networks for Fast and Accurate Super-Resolution," Proceedings of the IEEE Conference on Computer Vision and Pattern Recognition, pp. 624-632, 2017.

Liu et al., "A Video Drowning Detection Device Based on Underwater Computer Vision" The Institution of Engineering and Technology Image Press, vol. 17, pp. 1905-1918, Feb. 5, 2023.

Nadeem et al., "Automatic Human Posture Estimation for Sport Activity Recognition with Robust Body Parts Detection and Entropy Markov Model," Multimedia Tools and Applications, vol. 80, pp. 21465-21498, Jun. 2021.

"New EnhanceNet-PAT AI Turns Low-Resolution Images into High-Res", https://edgy.app/new-ai-system-to-turn-low-resolution-images-to-high-resolution, 4 pages, Oct. 30, 2017.

Paul et al., "Human Detection in Surveillance Videos and its Applications—A Review," Adv. Signal Process, vol. 1, pp. 1-6, Nov. 22, 2013.

Sajjadi et al., "EnhanceNet: Single Image-Super Resolution Through Automated Texture Synthesis", Proceedings of the IEEE International Conference on Computer Vision, pp. 4491-4500, 2017.

"Taking Motion Analytics to a New Level With AI, AI Motion Analytics Software Solutions," Artificial Intelligence, https://www.osplabs.com/ai-motion-analytics/ 4 pages, Jan. 9, 2020.

Thomas, "Deep Learning Based Super Resolution, Without Using a GAN", Towards Data Science, https://towardsdatascience.com/deep-learning-based-super-resolution-without-using-gan, 50 pages, Feb. 24, 2019.

Wang et al., "Resolution-Aware Network for Image Super-Resolution", IEEE Transactions on Circuits and Systems for Video Technology, vol. 29, No. 5, pp. 1259-1269, May 2018.

Wei et al., "Unsupervised Recurrent Hyperspectral Imagery Super-Resolution Using Pixel-Aware Refinement", IEEE Transactions on Geoscience and Remote Sensing, vol. 60, pp. 1-15, Dec. 11, 2020.

Yan et al., "Multi-Instance Deep Learning: Discover Discriminative Local Anatomies for Bodypart Recognition," IEEE Transactions on Medical Imaging, vol. 35, No. 5, pp. 1332-1343, May 2016.

Yang et al., "Depth Map Super-Resolution Using Stereo-Vision-Assisted Model" Neurocomputing, vol. '39, pp. 1396-1406, Aug. 2014.

Yang et al., "LCSCNet: Linear Compressing-based Skip-Connecting Network for Image Super-Resolution" IEEE Transactions on Image Processing, vol. 29, vol. 39, pp. 1450-1464, 2019.

Zhao et al., "Stereo- and Neural Network-Based Pedestrian Detection," IEEE Transactions on Intelligent Transportation Systems, vol. 1, No. 3, pp. 148-154, Sep. 2000.

(56)          References Cited

OTHER PUBLICATIONS

International Search Report in International Application No. PCT/US2021/029380 dated Jul. 16, 2021.

* cited by examiner

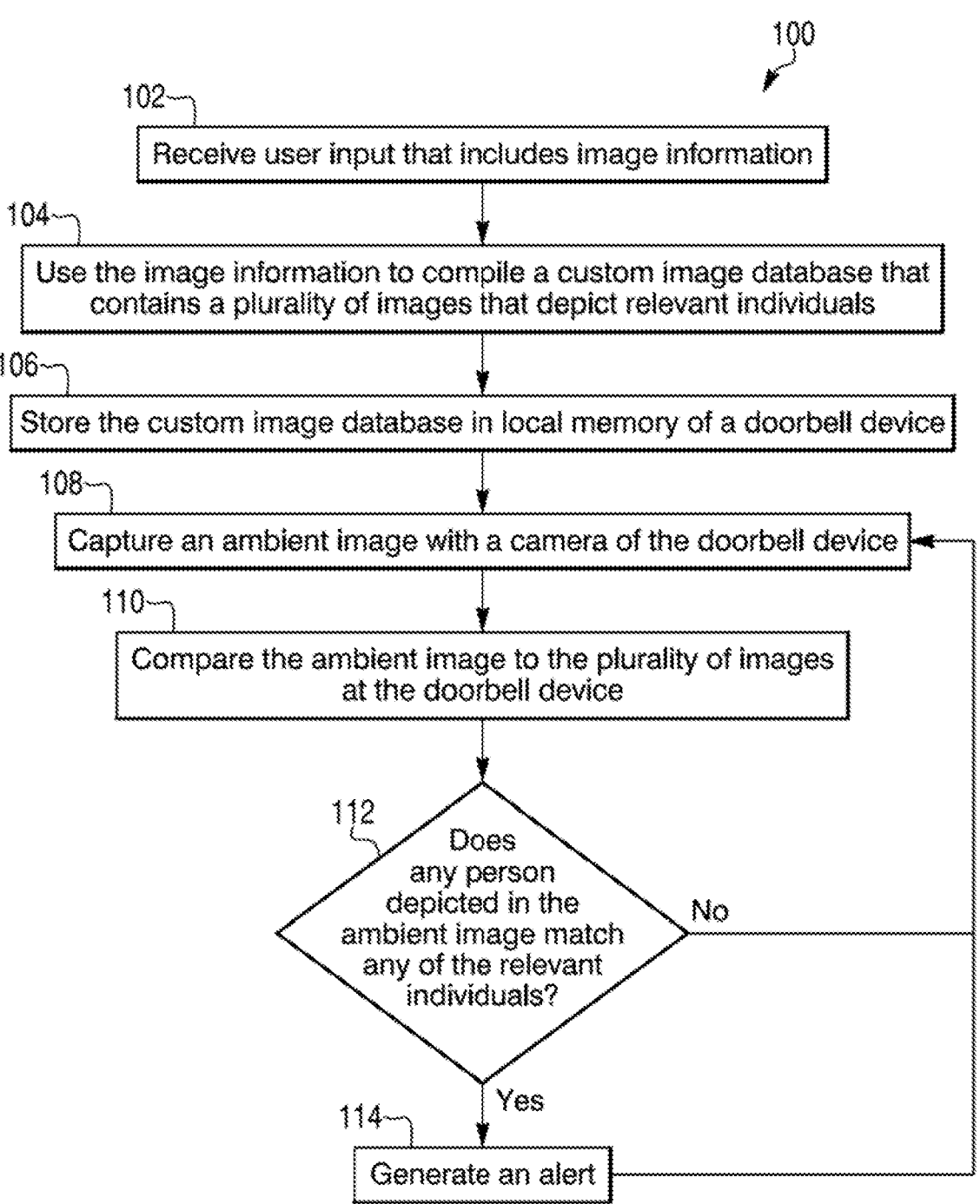

100

102 — Receive user input that includes image information

104 — Use the image information to compile a custom image database that contains a plurality of images that depict relevant individuals 106 — Store the custom image database in local memory of a doorbell device 108 — Capture an ambient image with a camera of the doorbell device 110 — Compare the ambient image to the plurality of images at the doorbell device 112 — Does any person depicted in the ambient image match any of the relevant individuals?

No

Yes

114 — Generate an alert

FIG. 3

SYSTEMS AND METHODS FOR IDENTIFYING USER-CUSTOMIZED RELEVANT INDIVIDUALS IN AN AMBIENT IMAGE AT A DOORBELL DEVICE

CROSS-REFERENCE TO RELATED APPLICATION(S)

This application claims the benefit of priority from and is a continuation of U.S. patent application Ser. No. 16/860, 157, filed Apr. 28, 2020, now U.S. Pat. No. 11,978,328, whereby the contents of which are incorporated herein by reference in their entirety.

FIELD

The present invention relates generally to doorbell devices. More particularly, the present invention relates to systems and methods for identifying user-customized relevant individuals in an ambient image at a doorbell device.

BACKGROUND

A known doorbell device can capture an ambient image and receive signals from a remote cloud server that indicate whether any person depicted in the ambient image is a threat to a region outside of which the doorbell device is located. However, such known systems remotely process the ambient image on the remote cloud server and compare the ambient image to a large, unrestricted universe of databases in an attempt to find a match for any person depicted in the ambient image. Accordingly, known systems consume a large amount of time and processing power to process the ambient image.

In view of the above, there is a need and an opportunity for improved systems and methods.

BRIEF DESCRIPTION OF THE DRAWINGS

FIG. 3 is a flow diagram of a method in accordance with disclosed embodiments.

DETAILED DESCRIPTION

Figure 1:
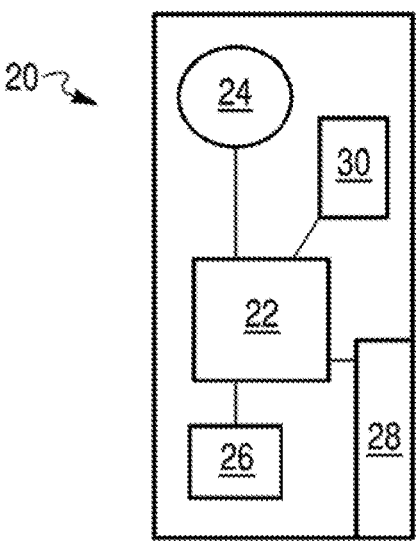
FIG. 1 is a block diagram of a doorbell device in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments of the claimed invention can include systems and methods for identifying user-customized relevant individuals in an ambient image at a doorbell device. In some embodiments, the doorbell device can include a processor, a local memory, and a camera, and in some embodiments, the processor can receive user input that includes image information, compile a custom image database using the image information, and store the custom image database in the local memory. In some embodiments, the custom image database can contain a plurality of images that can depict such relevant individuals, and in some embodiments, a number of the relevant individuals can be less than or equal to a predetermined maximum. For example, in some embodiments, the predetermined maximum can be proportional to a processing power of the processor.

In some embodiments, after the local memory stores the custom image database therein, the camera can capture an ambient image, and the processor can determine whether any person depicted in the ambient image matches any of the relevant individuals by comparing the ambient image to the plurality of images. When any person depicted in the ambient image matches any of the relevant individuals, the processor can generate an alert. In some embodiments, determining whether any person depicted in the ambient image matches any of the relevant individuals can include determining whether a first number of extracted features of a first person depicted in the ambient image match a predetermined number of extracted features of any of the relevant individuals.

For example, in some embodiments, the extracted features can include human characteristics, such as eye color, hair color, face size, face shape, and any other human characteristic as would be known to one of ordinary skill in the art. Furthermore, in some embodiments, a particular one of the extracted features may be given more weight than other ones of the extracted features in determining whether there is a match.

Additionally or alternatively, in some embodiments, the extracted features can include facial recognition characteristics. In these embodiments, the processor can vector map the plurality of images with an artificial intelligence model to identify respective facial recognition characteristics of each of the relevant individuals and store results of such vector mapping in the local memory as part of the custom image database for later use. Similarly, after the ambient image is captured, the processor can vector map the ambient image with the artificial intelligence model to identify personal facial characteristics of any person depicted in the ambient image. Then, the processor can determine that any person depicted in the ambient image matches any of the relevant individuals when the personal facial recognition characteristics of any person depicted in the ambient image match the respective facial recognition characteristics of any of the relevant individuals.

As explained above, the processor can compile and store the custom image database in the local memory of the doorbell device before the camera captures the ambient image and the processor determines whether any person depicted in the ambient image matches any of the relevant individuals. Advantageously, storing the custom image database in the local memory of the doorbell device prior to the camera capturing the ambient image and the processor determining whether any person depicted in the ambient image matches any of the relevant individuals enables the doorbell device to identify a presence of any of the relevant individuals locally and without communicating with a cloud server or any other external databases that are remote from the doorbell device, thereby (1) enabling a quicker identification of the presence of any of the relevant individuals when compared to systems and methods that communicate with the cloud server and the external databases after the camera captures the ambient image, (2) reducing latency that would otherwise be caused by communicating with the cloud server and the external databases after the camera captures the ambient image, and (3) providing enhanced security to a user, for example, by preventing the relevant individuals from evading identification by severing a connection between the doorbell device and the cloud server.

As explained above, the processor can receive the user input that includes the image information for use in compiling the custom image database. In some embodiments, the doorbell device can include a transceiver that can receive the user input from a user device via a network. Additionally or alternatively, in some embodiments, the doorbell device can include a local user interface, such as a keypad or a touch screen that can receive the user input.

In some embodiments, the image information can include threat criteria, a geographic location, and a location range, and in these embodiments, the processor can parse the threat criteria to identify relevant image databases to query and retrieve the plurality of images from the relevant image databases. Accordingly, in these embodiments, each of the plurality of images can depict a respective registered individual who is associated with (1) a respective criminal history that matches the threat criteria and (2) a respective residence that falls within the location range of the geographic location, and the relevant individuals can include the respective registered individual depicted in each of the plurality of images.

Additionally or alternatively, in some embodiments, the image information can include a plurality of grey-list images, each of which can depict a respective user-identified individual. In these embodiments, the processor can compile the plurality of grey-list images into the custom image database, and the relevant individuals can include the respective user-identified individual depicted in each of the plurality of grey-list images. In some embodiments, the respective user-identified individual depicted in any of the plurality of grey-list images can include a known safe person, such as a family member of the user, a babysitter employed by the user, a housekeeper employed by the user, and/or a friend of the user. Additionally or alternatively, in some embodiments, the respective user-identified individual depicted in any of the plurality of grey-list images can include a known un-safe person, such as an ex-spouse of the user, an ex-partner of the user, and/or a stalker of the user. In some embodiments, the processor can generate a first of a plurality of alerts when the processor determines that any person depicted in the ambient image matches the known safe person and generate a second of a plurality of alerts when the processor determines that any person depicted in the ambient image matches the known un-safe person.

In some embodiments, the processor can compile the custom image database at the doorbell device. Additionally or alternatively, in some embodiments, the processor can compile the custom image database by receiving the custom image database from the cloud server, and in these embodiments, the cloud server can execute some steps that would be otherwise executed by the processor as described above. For example, in some embodiments, the cloud server can parse the threat criteria to identify the relevant image databases to query and retrieve the plurality of images from the relevant image databases. Additionally or alternatively, in some embodiments, the cloud server can compile the plurality of grey-list images into the custom image database. Additionally or alternatively, in some embodiments, the cloud server can vector map the plurality of images with the artificial intelligence model to identify the respective facial recognition characteristics of each of the relevant individuals. Additionally or alternatively, in some embodiments, the cloud server can receive the user input from the user device via the network or from the doorbell device itself, for example, when the local user interface receives the user input.

Figure 2:
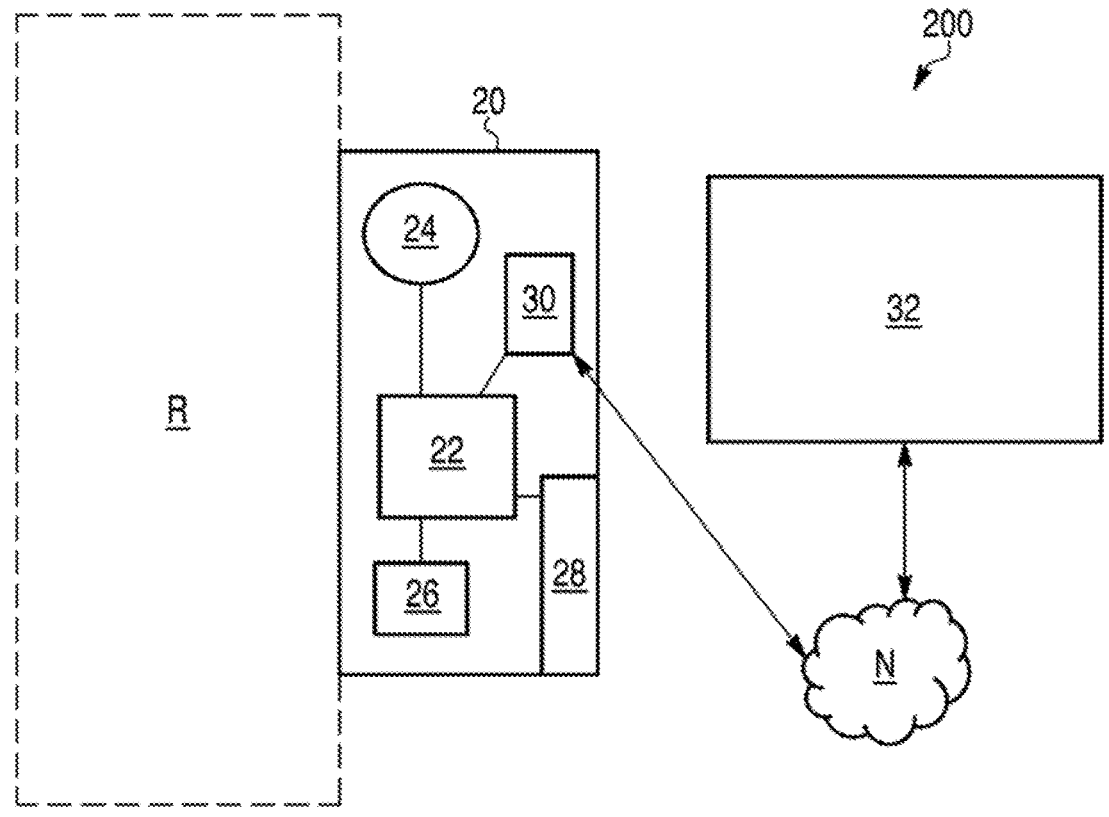
FIG. 2 is a block diagram of a system in accordance with disclosed embodiments.

FIG. 1 is a block diagram of a doorbell device 20 in accordance with disclosed embodiments, and FIG. 2 is a block diagram of a system 200 in accordance with disclosed embodiments. As seen in FIG. 1, in some embodiments, the doorbell device 20 can include a processor 22, a camera 24, a local memory 26, a local user interface 28, and a transceiver 30. As seen in FIG. 2, in some embodiments, the system 200 can include the doorbell device 20 and a cloud server 32 such that the doorbell device 20 can be located outside of a region R and such that the transceiver 30 can communicate with the cloud server 32 via a network N.

FIG. 3 is a flow diagram of a method 100 in accordance with disclosed embodiments. As seen in FIG. 3, the method 100 can include the doorbell device 20 or the cloud server 32 receiving user input that includes image information, as in 102, and the doorbell device 20 or the cloud server 32 using the image information to compile a custom image database that contains a plurality of images that depict relevant individuals, as in 104. Then, the method 100 can include the doorbell device 20 storing the custom image database in the local memory 26, as in 106.

After storing the custom image database in the local memory 26, the method 100 can include the doorbell device 20 capturing an ambient image with the camera 24, as in 108. Then, the method 100 can include the doorbell device 20 comparing the ambient image to the plurality of images stored in the custom image database in the local memory 26, as in 110, and using results of such a comparison to determine whether any person depicted in the ambient image matches any of the relevant individuals, as in 112. When all people depicted in the ambient image fail to match any of the relevant individuals, the method 100 can continue capturing ambient images, as in 108. However, when any person depicted in the ambient image matches any of the relevant individuals, the method 100 can include the doorbell device 20 generating an alert, as in 114, before continuing to capture ambient images, as in 108.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

capturing, via a camera associated with a device, an image, the image corresponding to a region outside a location, the image comprising content corresponding to a representation of a person;

analyzing, by the device, the image, and determining characteristics of the person;

extracting, by the device, from the image, the determined characteristics;

accessing, by the device, from memory of the device, a collection of stored images, the collection of stored images being images previously captured by the camera and stored in the memory of the device, each stored image comprising information related to a known threat previously determined via analysis of the previously captured images within the collection, the known threat based on a location range of a residence of a depicted individual in a respectively stored image to the location, wherein the collection of stored images has a maximum number that corresponds to processing power of the device;

comparing, by the device, the determined characteristics extracted from the captured image with characteristics associated with images in the collection of stored images to identify a match with the known threat;

determining, by the device, based on analysis of the captured image and the comparison based on the collection of stored images, an event to the location; and generating, by the device, an alert at the location based on a type of the alert, the alert indicating detection of the known threat.

2. The method of claim 1, further comprising:

communicating, from a cloud server to the device, image information, the image information corresponding to a type of activity for the device to detect via the camera, wherein the communication causes the device to compile and store a plurality of images based on the image information.

3. The method of claim 2, further comprising:

storing, in storage associated with the device, the plurality of images, wherein the collection of stored images further comprises the plurality of images stored in storage.

4. The method of claim 1, wherein the compilation of the plurality of images is based on analysis of a threat criteria.

5. The method of claim 1, wherein the type of event corresponds to a determination that the person is a safe person.

6. The method of claim 1, wherein the type of event corresponds to a determination that the person is an un-safe person.

7. The method of claim 1, wherein the analysis of the image is based on a facial recognition analysis of the image.

8. The method of claim 1, wherein the analysis of the image is based on an artificial intelligence (AI) vector mapping of the image.

9. The method of claim 1, wherein the captured image is an ambient image.

10. A device comprising:

a processor configured to:

capturing, via an associated camera, an image, the image corresponding to a region outside a location, the image comprising content corresponding to a representation of a person;

analyze, the image, and determine characteristics of the person;

extract, from the image, the determined characteristics;

access, from memory of the device, a collection of stored images, the collection of stored images being images previously captured by the camera and stored in the memory of the device, each stored image comprising information related to a known threat previously determined via analysis of the previously captured images within the collection, the known threat based on a location range of a residence of a depicted individual in a respectively stored image to the location, wherein the collection of stored images has a maximum number that corresponds to processing power of the device;

compare the determined characteristics extracted from the captured image with characteristics associated with images in the collection of stored images to identify a match with the known threat;

determine, based on analysis of the captured image and the comparison based on the collection of stored images, an event to the location; and generate, by the device, an alert at the location based on a type of the alert, the alert indicating detection of the known threat.

11. The device of claim 10, wherein the processor is further configured to:

communicate, from a cloud server to the device, image information, the image information corresponding to a type of activity for the device to detect via the camera, wherein the communication causes the device to compile and store a plurality of images based on the image information.

12. The device of claim 11, wherein the processor is further configured to:

store, in storage associated with the device, the plurality of images, wherein the collection of stored images further comprises the plurality of images stored in storage.

13. The device of claim 10, wherein the compilation of the plurality of images is based on analysis of a threat criteria.

14. The device of claim 10, wherein the type of event corresponds to a determination that the person is one of a safe person or un-safe person.

15. The device of claim 10, wherein the analysis of the image is based on a facial recognition analysis of the image.

16. The device of claim 10, wherein the analysis of the image is based on an artificial intelligence (AI) vector mapping of the image.

17. The device of claim 10, wherein the captured image is an ambient image.

18. A non-transitory computer-readable storage medium tangibly encoded with computer-executable instructions, that when executed by a device, perform a method comprising:

capturing, via a camera associated with the device, an image, the image corresponding to a region outside a location, the image comprising content corresponding to a representation of a person;

analyzing, by the device, the image, and determining characteristics of the person;

extracting, by the device, from the image, the determined characteristics;

accessing, by the device, from memory of the device, a collection of stored images, the collection of stored images being images previously captured by the camera and stored in the memory of the device, each stored image comprising information related to a known threat previously determined via analysis of the previously captured images within the collection, the known threat based on a location range of a residence of a depicted individual in a respectively stored image to the location, wherein the collection of stored images has a maximum number that corresponds to processing power of the device;

comparing, by the device, the determined characteristics extracted from the captured image with characteristics associated with images in the collection of stored images to identify a match with the known threat;

determining, by the device, based on analysis of the captured image and the comparison based on the collection of stored images, an event to the location; and generating, by the device, an alert at the location based on a type of the alert, the alert indicating detection of the known threat.

* * * * *